(12) United States Patent  (10) Patent No.: US 7,890,433 B2
Singhal  (45) Date of Patent: Feb. 15, 2011

(54) PRIVATE AND SECURE PAYMENT SYSTEM

(76) Inventor: Tara Chand Singhal, P.O. Box 5075, Torrance, CA (US) 90510

( * ) Notice: Subject to any disclaimer, the term of this patent is extended or adjusted under 35 U.S.C. 154(b) by 2030 days.

(21) Appl. No.: 10/046,834

(22) Filed: Jan. 15, 2002

(65) Prior Publication Data

US 2002/0062281 A1  May 23, 2002

Related U.S. Application Data

(60) Provisional application No. 60/215,261, filed on Jun. 30, 2000, provisional application No. 60/237,328, filed on Oct. 2, 2000, provisional application No. 60/255,002, filed on Dec. 9, 2000, provisional application No. 60/270,750, filed on Feb. 21, 2001.

(51) Int. Cl.
  *G06Q 20/00* (2006.01)
(52) U.S. Cl. .......................................... 705/64; 705/53
(58) Field of Classification Search .................. 705/64, 705/35, 40, 34, 39, 42, 14, 26, 27
  See application file for complete search history.

(56) References Cited

U.S. PATENT DOCUMENTS

| 4,868,376 | A |   | 9/1989  | Lessin et al. |
| 5,220,501 | A | * | 6/1993  | Lawlor et al. .................. 705/40 |
| 5,276,311 | A |   | 1/1994  | Hennige |
| 5,329,589 | A |   | 7/1994  | Fraser et al. |
| 6,076,075 | A |   | 6/2000  | Teicher |
| 6,327,578 | B1|   | 12/2001 | Linchan |
| 6,587,835 | B1| * | 7/2003  | Treyz et al. ..................... 705/14 |
| 6,592,044 | B1|   | 7/2003  | Wong et al. |
| 6,941,286 | B1| * | 9/2005  | Foth ............................ 705/403 |
| 2001/0029485 | A1 | | 10/2001 | Brody et al. |

FOREIGN PATENT DOCUMENTS

| DE | 19903363 A | 8/2000 |
| EP | 0910 028 A | 4/1999 |
| EP | 1003139 | 5/2000 |
| EP | 1093097 A | 4/2001 |
| WO | WO 97/45814 A | 12/1997 |

OTHER PUBLICATIONS

Kuykendall, Lavonne Credit Card Management , v 12 , n 8 , p. 78-83 , Nov. 1999 Document Type: Periodical; Feature ISSN: 0896-9329 Journal Code: CCM.*

* cited by examiner

*Primary Examiner*—Ojo O Oyebisi
*Assistant Examiner*—Ella Colbert
(74) *Attorney, Agent, or Firm*—Steven G. Roeder, Esq.

(57) ABSTRACT

With the payment system 02 of the present invention, a customer 06 may conduct a private and secure payment transaction (i) with a merchant 08 using a wireless device 12, (ii) with a merchant using a payment card 100, (iii) with a merchant using a bank card 130 (iv), with a merchant using any one of the wireless device 12, a payment card 100 or a bankcard 130 (v) with a private party using a wireless device 12 and (vi) withdraw cash from an ATM machine using a wireless device 12. In all of these embodiments, a customer does not share his identity, personal sensitive data and purchasing habits with the merchants, the banks or the private party. In many of these embodiments, a customer need not carry his bankcards and or personal checks bearing personal and sensitive data with him/her avoiding the risks of theft or loss.

20 Claims, 11 Drawing Sheets

PRIVATE AND SECURE PAYMENT SYSTEM

CROSS REFERENCE TO RELATED APPLICATIONS

This application is related to and claims priority on Provision Application Ser. No. 60/215,261, entitled "Method and Apparatus for an integrated Payment Card," filed on Jun. 30, 2000, by Tara Chand Singhal.

This application is also related to and claims priority on Provisional Application Ser. No. 60/237,328, filed Oct. 2, 2000, entitled "Method and Apparatus for an Intergrated Payment Card and Data Security," by Tara Chand Singal.

This application is also related to and claims priority on U.S. application Ser. No. 09/891,913, filed Jun. 26, 2001, entitled "Method and Apparatus for a Payment Card Systems," by Tara Chand Singhal.

This application is related to and claims priority on Provisional Application Serial No. 60/255,002, entitled "Method and Apparatus for an Integrated Identity Security and Payment System," filed on Dec. 9, 2000, by Tara Chand Singhal.

This application is also related to and claims priority on Provisional Application Serial No. 60/270,750, filed Feb. 21, 2001, entitled "Method and Apparatus for an Integrated Identity Security and Payment System," by Tara Chand Singhal.

This application is also related to and claims priority on U.S. application Ser. No. 10/014,040, filed Dec. 10, 2001, entitled "Method and Apparatus for an Integrated Identity Security and Payment System," by Tara Chand Singhal.

The contents of Application Serial Nos. 60/215,261, 60/237,328, 09/891,913 60/215,261, 60/237,328 and 10/014,040 are incorporated herein by reference.

FIELD OF THE INVENTION

The present invention is directed to facilitating private and secure payment transactions between a customer and a merchant and between private parties.

BACKGROUND

With reference to FIG. 1, when making a payment to a merchant with the help of a bankcard 1000, the bankcard is swiped through a card reader 1002, which is connected to the merchant computer system 1004. The card reader reads the information from the card such as card number, expiration date, and customer name. The data read from the bankcard 1000 is copied into the merchant system 1004 and is combined with the items being purchased. A third party merchant processor 1010 is used to approve the total purchase amount by contacting an automated clearinghouse (ACH) 1014. The ACH receives authorization from the customer bank 1016 and returns an authorization code. After an authorization is obtained by the merchant system 1004 from the merchant processor 1010, it prints a customer receipt 1008 requiring customer signature. A paper or an electronic copy of the customer signature 1006 is retained by the merchant system while a copy is given to the customer 1008.

This system of payment presents many privacy and security risks to the customer 1020. To the customer, there is privacy risk because the merchant retains detailed data on the customer and the items being bought and when they were bought. These data may be shared with or sold to other parties. To the customer there is a security risk as the printed receipt 1008 contains some or all of the personal sensitive data, which the customer has to safeguard and to properly dispose of when not needed.

The merchant retains the customer sensitive data of name, card number and signature. This presents an additional security risk in that; computer hackers and thieves may steal it. Multiplicity of data records is kept with many merchants as a record is created with each merchant each time a payment transaction is conducted. Thus the customer sensitive data is stored with many merchants in many paper and database records. This significantly raises the probability of theft and hacking from the merchant paper and computer records. In FIG. 1, these privacy and security risks are shown as Privacy and Security Risk A.

To the customer there is privacy risk as the customer bank 1016 is notified which merchant a customer of the bank purchased from and when and how much was spent on each purchase. A bank statement 1018 listing each purchase from a merchant is created and sent to the customer 1020. The bank 1016 may sell or use the information in statement 1018 for its own purpose. FIG. 2, an advertisement from, Wall Street Journal, Dec. 19, 2001, is an illustration of how the banks and merchants may be using the payment information. For example it shows that a bank customer bought ski lift tickets last week 1022, in addition to many other personal and private details 1024. In FIG. 1, these privacy and security risks are shown as Privacy and Security Risk B.

While some customers may not care that such data is kept in bank and merchant-owned computer systems, many people, based on published studies and stories, do care about the privacy and security of their personal data and the details of their purchasing habits.

There is yet another security risk to the customer, as he/she has to carry his/her bank card with him/her all the time and this is subject to theft and loss.

There are other forms of payment transactions that present similar privacy and security risks to the customer such as, between two parties via a check, as the checks are imprinted with customer name, address, bank account number and other information.

In light of the above, it is an objective of the present invention to have a payment system for the customer between a merchant and between private parties that has none of the privacy and security risks, as outlined above.

SUMMARY

With the payment system of the present invention, a customer may conduct a private and secure payment transaction: (i) with a merchant using a wireless device; (ii) with a merchant using a payment card; (iii) with a merchant using a bank card; (iv) with a merchant using either a wireless device, a payment card or a bank card; (v) with a private party using a wireless device; and (vi) withdraw cash from an ATM machine using a wireless device.

In all of these embodiments, a customer does not share his/her identity, personal sensitive data, and purchasing habits with the merchants and the banks. In many of these embodiments, a customer need not carry his/her bankcards and/or personal checks bearing personal and sensitive data thus, avoiding the risks of theft or loss. The payment system includes a central system, a wireless device belonging to a customer, a payment card generated by the central system and sent to the customer, and an existing bankcard.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Introduction

Five embodiments of a private and secure payment system are described. In the first embodiment a portable wireless-device is used by the customer to make a payment to a merchant and is illustrated with reference to FIGS. 3, 5 and 8. In the second embodiment a payment card, of the present invention, is used by the customer to make a payment to a merchant and is illustrated with reference to FIGS. 3, 7 and 8. In the third embodiment, either a portable wireless device, or a payment card of this invention, or a standard bankcard can be used by the customer to make a payment to a merchant and is illustrated with reference to FIGS. 3, 8 and 9A. In the fourth embodiment, a portable wireless device is used to make a private payment between two parties and is illustrated with reference to FIGS. 4, 8 and 9B.

Figure 5:
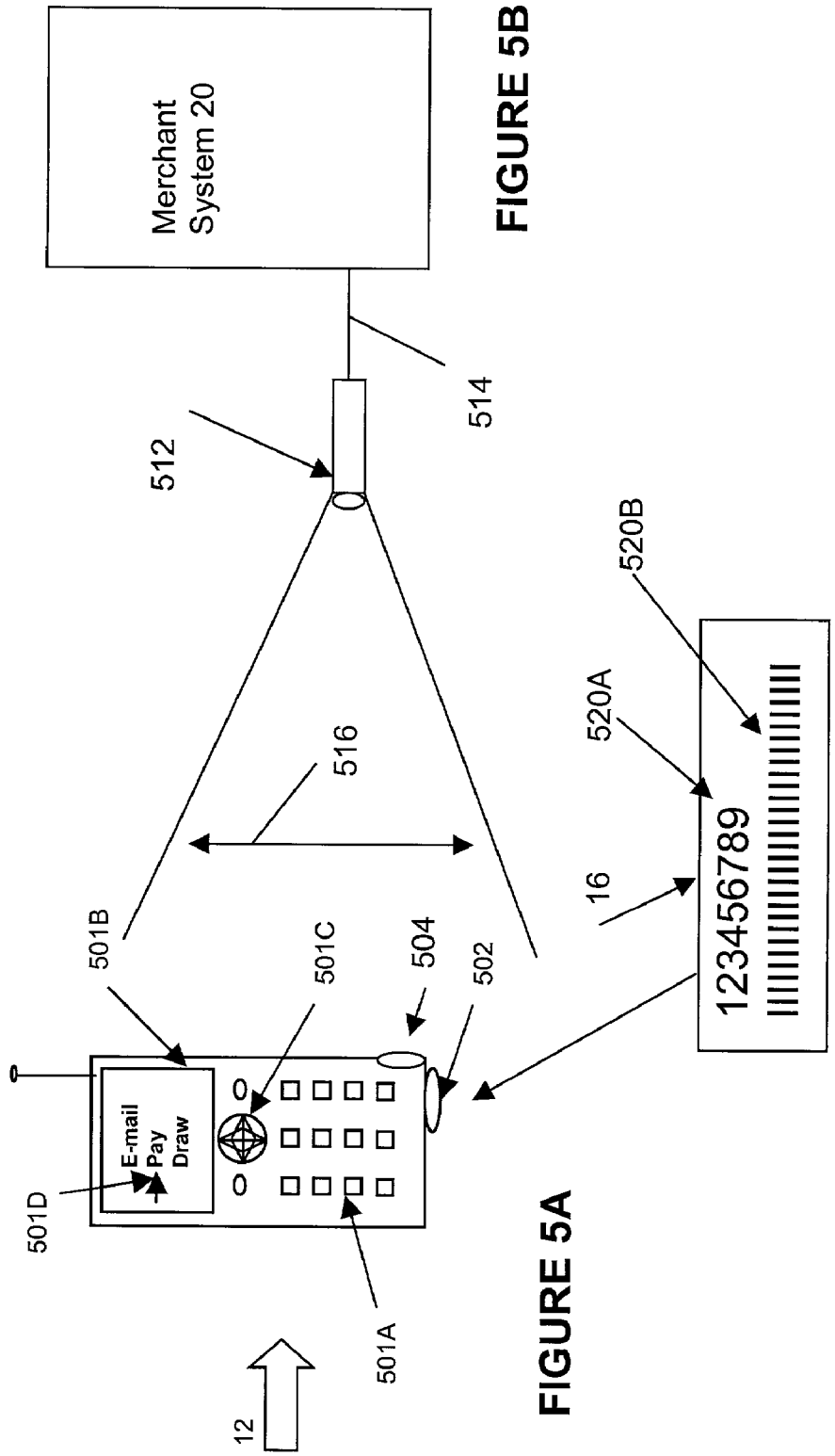
FIGS. 5A-C are illustrations of use of a wireless device for a payment transaction having features of the present invention.

In the fifth embodiment, a portable wireless device is used to withdraw cash at an ATM and is illustrated with reference to FIGS. 5 and 6.

Figure 9A:
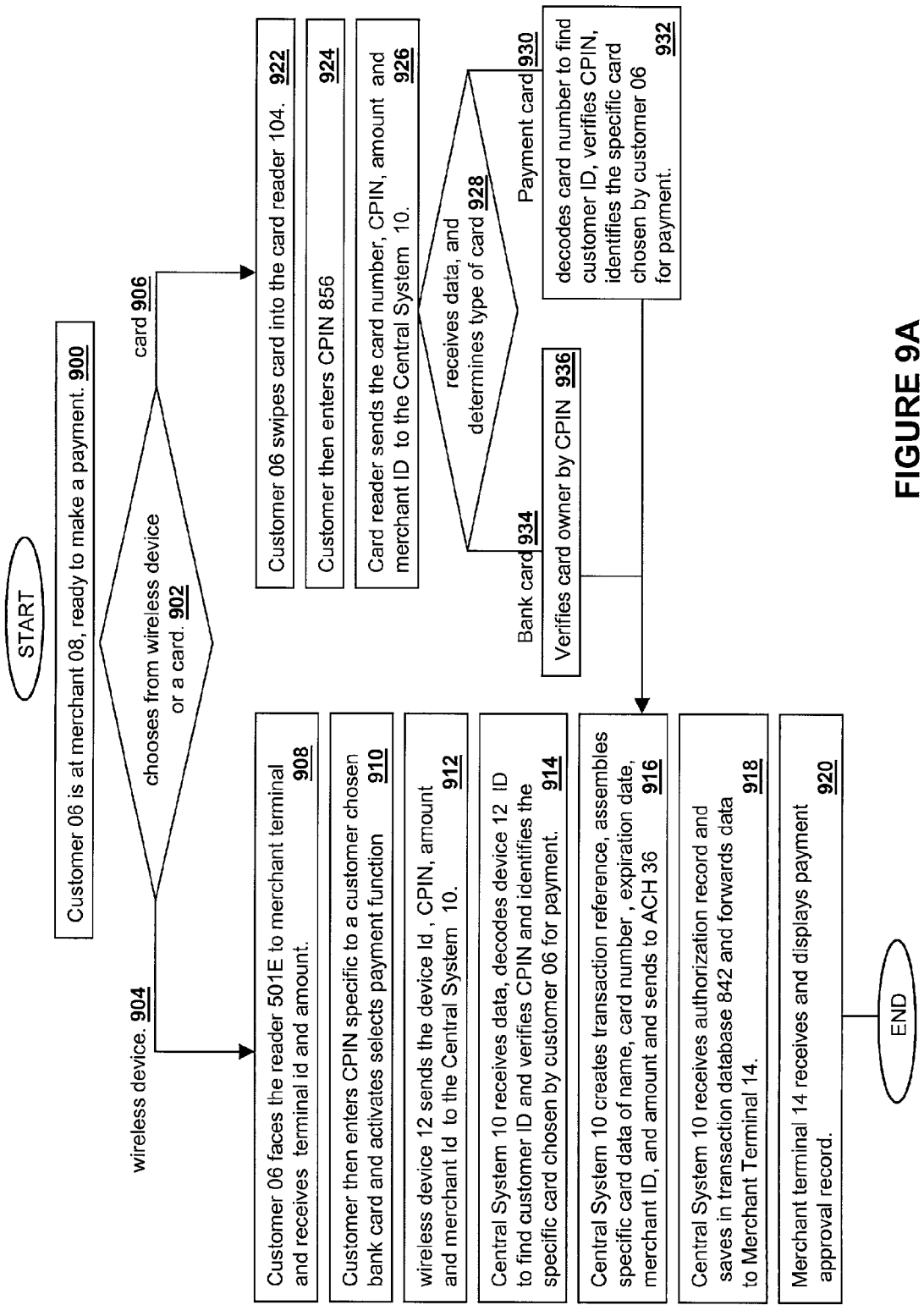
FIGS. 9A-B illustrate flow charts of the payment system operation, having feature of the present invention.
Figure 9B:
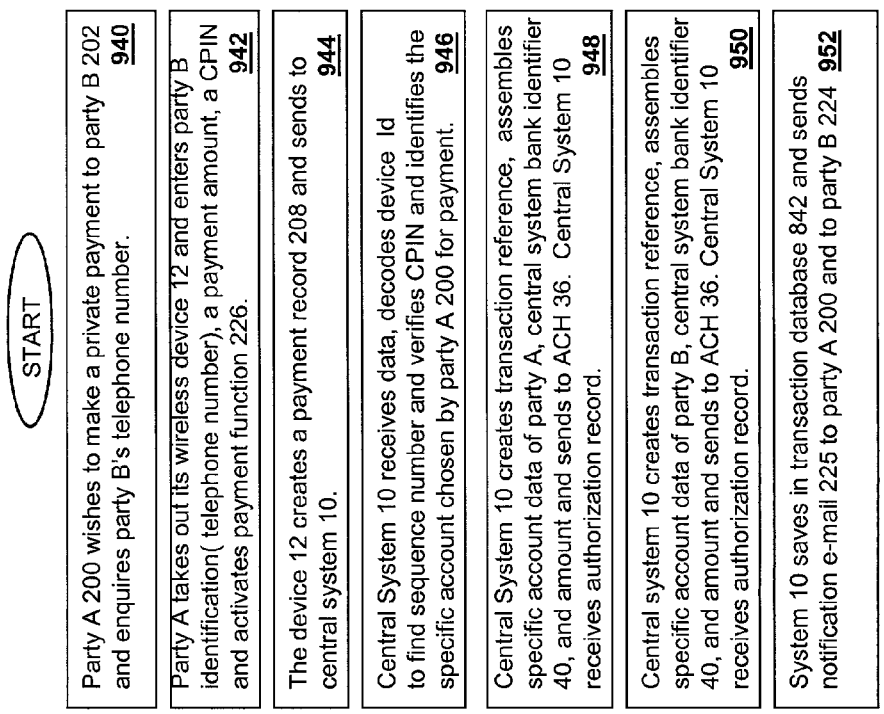

FIGS. 9A-B show the operational steps of the payment system. These embodiments offer privacy and security to the customer in payment transactions.

Figure 1:
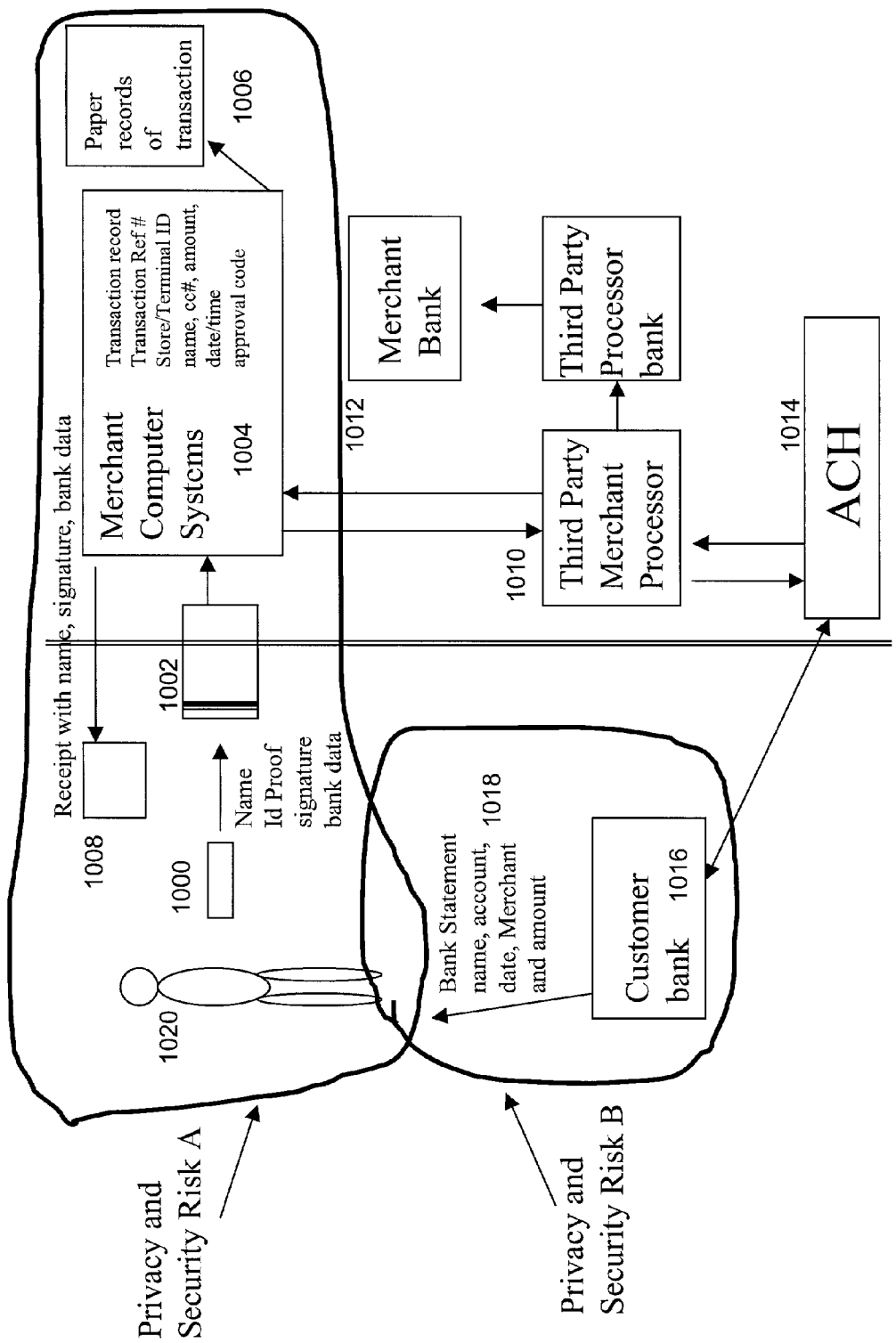
FIG. 1 is a block diagram that illustrates a prior art payment system and its privacy and security risks.
Figure 2:
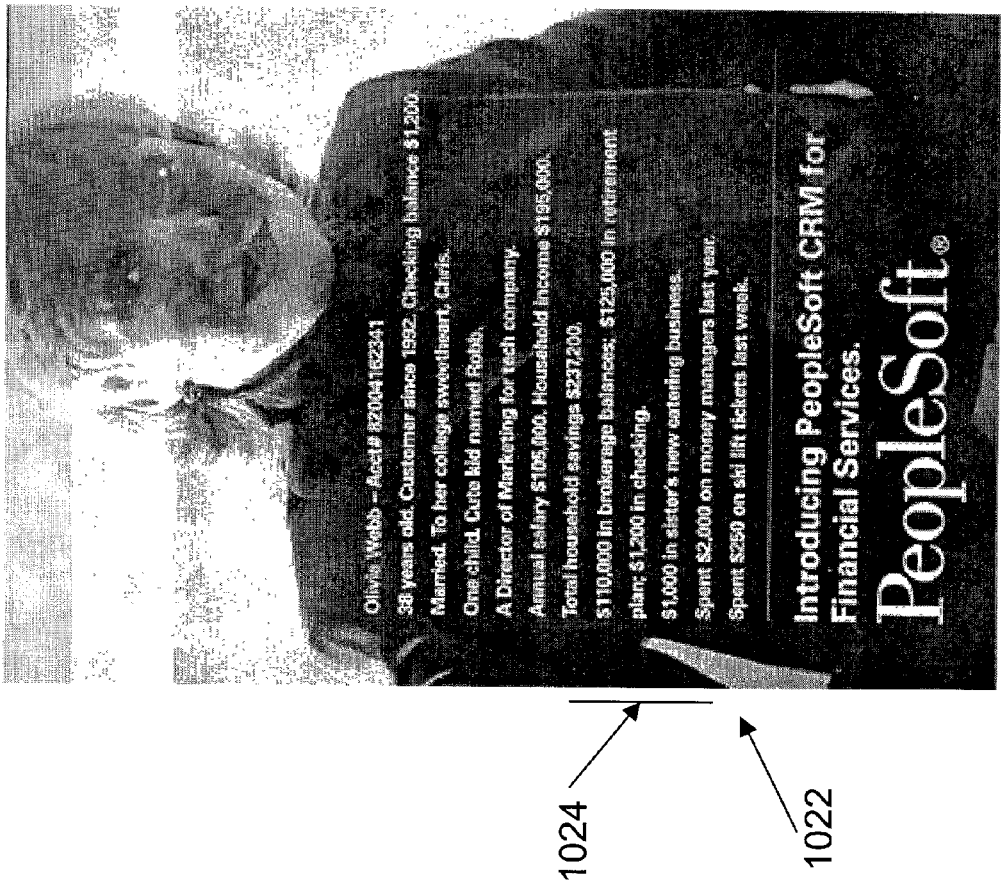
FIG. 2 is an illustration of privacy and security risks of personal data in prior art payment system.
Figure 3:
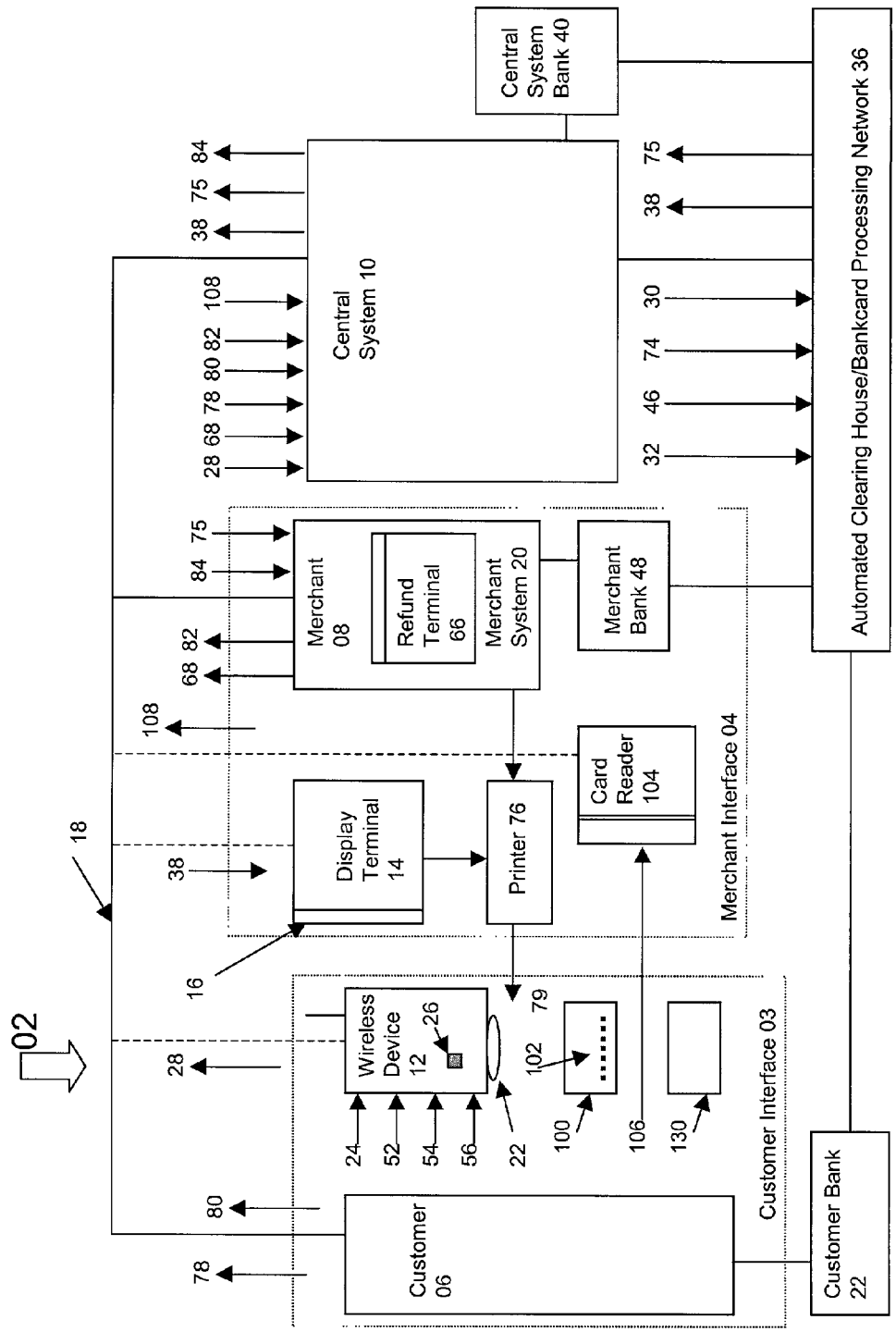
FIG. 3 is a block diagram that illustrates features of the present invention payment system between a customer and a merchant.

With initial reference to FIG. 3, a payment system apparatus 02 facilitates private and secure payment transactions. The apparatus 02 has a central system 10 (described later with reference to FIG. 8) that works in conjunction with a wireless device 12, a payment card 100, or a bankcard 130. The payment system 02 of this invention does not require the customer to give any personal data including name, bankcard data, identification data such as driver license etc, to a merchant during payment transaction. The merchant cannot keep and track the customer's buying habits. The merchant does not have the burden of safeguarding customer sensitive data from theft and misuse. In many of these embodiments, a customer need not carry his/her bankcard with him, avoiding loss or theft of bankcards.

In addition, a party A can make a payment to another private party B without disclosing personal sensitive data as it happens when giving a personal check for payment. Most personal checks are imprinted with name, address and driver license data and reveal customer bank and bank account number.

Additionally, many people use ATM, which require having an ATM card. One of the embodiments facilitates use of a wireless device in lieu of an ATM card. This embodiment also helps party A perform money transfer to party B via an ATM at a location where party A is not present but party B is present. In addition no ATM card need to be carried, and many people carry a wireless device in the form of a cellular telephone.

In summary, a customer may use a wireless device, a payment card or a bankcard to conduct a private and secure payment transaction with a merchant. The customer may use the wireless device to conduct a private and secure payment transaction between two parties. Also, using a wireless device, a customer may withdraw cash at an ATM. The embodiments as outlined above are described herein. The headings are provided for the convenience of the reader.

First Embodiment Using Wireless Device

With reference to FIGS. 3, 5A-C and 8, a payment system 02 between a customer 06 and a merchant 08 has a central system 10, a portable wireless device 12, and a merchant display terminal 14 with an identification tag 16. The central system, the portable wireless device and the merchant terminal are on a global computer network 18. The portable wireless device is used to effect a private and secure payment transaction from the customer to the merchant.

Wireless Device 12

The portable wireless device 12 may be a cellular telephone with a screen and a keypad. Alternatively, it may be PDA with a wireless modem, which also has a display screen and a soft keypad.

The portable wireless device 12 has an interface that enables it to receive merchant identification and payment amount at the time of the payment transaction. The interface may consist of a numeric keypad with a screen, an optical-magnetic reading element or an infrared reading element. The operation of the interface is described below.

FIG. 5A shows a wireless device 12, with a keypad 501A, a cursor control 501C, menu function 501D on a screen 501B. It also shows a reading element 502, which may be an optical character reading element. It also shows a reading element 504, which may be an infrared reading element.

The interface may consist of the customer manually entering the merchant identification and the payment amount in the wireless device using the keypad 501A and the screen 501B. Typically, the customer may not be at the location where the merchant is located such as for a catalog merchant, and is given the information by the merchant.

In addition, the interface may consist of a reading element 504 receiving a wireless transmission of the merchant identification 520A and a payment amount 24 from a merchant system 20. The transmission may be wireless infrared commonly used in many remote control applications such as a television. FIG. 5B in conjunction with FIG. 5A shows that the merchant system 20, with a serial interface 514, may be connected to an infrared transmission device 512, which generates an area of transmission 516 and which is read by element 504 of the wireless device 12.

Typically, the customer is at a merchant checkout counter and is holding the device 12 in his hand enabling it to receive the transmission. The system 20 can generate the data for the transmission at the time when the payment amount has been determined and is communicated to the customer to make a payment, allowing the customer to use the device 12 to receive the transmission.

Alternatively, the interface may also have a reading element 502 that scan-reads the identification tag 16 to read the terminal ID 520A and a payment amount 24 is manually entered into the device 12 by the customer. The reading element 502 is an optical type. The tag 16 is of the type 520A showing numerical characters that can be read by an optical or magnetic reading element or it may be a bar code type 520B.

The identification tag 16 identifies the merchant, the store, and the terminal within the store for those merchants having more than one store and having more than one payment terminal in a store. FIG. 5C shows a merchant identification tag 16 with numerical merchant identification 520A and/or a bar code 520B.

Typically, when the customer is at merchant checkout counter, the customer is holding the device 12 in his/her hand and scans the tag 16 to read the terminal identification. And then subsequently enters a payment amount.

After the merchant terminal identification and payment amount are entered by any one of the three interface means described above, they are held in temporary memory of the device 12. Then the customer 06 enters a Card Personal Identification Number (CPIN). A CPIN 856 is a personal identification code that identifies the customer and/or identifies the customer and one of the bankcards he/she wishes to use for the payment transaction. As an illustration, the customer may have CPIN 2301 that identifies a Visa card and 2302 that identifies a Master card, if he has two cards in the central system 10 that were pre-stored by the customer. If there is only one pre-stored card, there is only one CPIN. The pre-stored accounts may include a plurality of cards such as credit cards, debit cards, ATM cards or bank accounts.

The device 12 has an identification code 850, which uniquely identifies the device. The code 850 may be the telephone number assigned to the device 12 or the code 850 may be a identification identifying the chip inside the device 12 or the code 850 may be the frequency code used by the device 12.

The device 12 has a payment function 26. The payment function 26 is a firmware function within the device 12, which may be activated by a menu item "payment", a keypad key combination such as an arrow key followed by a numeric key, or a special key for payment. The payment function 26, on being activated, creates an encrypted payment data record 28 including at least the merchant terminal identification 862, the payment amount 24, CPIN 856 and the device identification code 850 and transfers it over the global network to the central system 10.

The system 10 on receiving the data record 28, after decryption, identifies and verifies the customer and the particular bankcard he/she wishes to use for this payment, using the device identification 850 and the CPIN 856. The customer may have a plurality of pre-stored accounts 858 in the central system 10. The customer enters an account identification in the form of CPIN 856 into the wireless device 12, identifying a specific account 858 to be used for a payment transaction. The account identification may be a combination of personal identification code verifying the customer and an account identification code and is collectively called CPIN 856 as described earlier.

Description Common to First, Second and Third Embodiment

The central system 10 assembles a payment transaction record 32 that includes the customer pre-stored bank account data 858, and submits the payment transaction record to an automated clearing house 36 and receives a payment authorization record 38. Subsequently the central system 10 sends the payment authorization record 38 to the merchant display terminal 14 using the terminal uniform resource locator 864 over the global computer network.

The payment transaction record 32 submitted to the ACH 36 identifies a central system business bank 40 for receiving payment amount from the customer bank 22. The ACH, depending upon the form of the bankcard or bank account is prior art bankcard authorization network for authorizing amounts from customer banks or a check automated clearinghouse used by banks to clear checks with each other.

After completion of the payment transaction from the customer to the merchant, the merchant funds from a plurality of payment transactions are in the bank 40. These merchant funds are transferred to the merchant bank account 48 on a periodic basis. To facilitate this fund transfer, the central system 10 has a merchant database 840 that maintains the terminal identification 862 and merchant identification 866 and a merchant bank account identification 868. The system 10 creates and submits a merchant payment record 46 to the ACH for transferring an aggregate amount from a plurality of payment transactions from the central system business bank 40 into the merchant bank account 48.

Refund from a Previous Payment Transaction

The central system 10 maintains a transaction database 842 cataloging each payment transaction by a transaction reference 870, date and time 872, an authorization reference 874, payment amount 876, customer identification 854, merchant identification 866, and payment sequence number 857.

The merchant 08 is paying the customer 06 for a refund from a previous payment transaction. A merchant refund terminal 66 is part of the merchant system 20, which is on the global computer network 18. The refund terminal 66 may a web-based interface. The merchant 08 enters into the refund terminal 66 a refund record 68 that includes, the payment transaction reference 870 from a previous payment transaction, merchant identification 866, a refund-authorizing password, and a refund amount and then the refund record 68 is sent to the central system 10.

The central system 10 receives the refund record 68 from the merchant system 20 and verifies the elements of the record against the transaction catalog 842, in particular, verifying the refund amount is less than or equal to the payment amount. The central system then creates a refund ACH record 74 identifying the central system bank 40 as the bank for receiving funds from the merchant bank account 48. The refund record 74 is sent to the ACH 36 and an approval record 75 is received. The central system 10 then forwards the refund approval record 75 to the refund terminal 66. The merchant system 20 having the refund terminal 66 is equipped with a printer capability 76 and prints a refund record. The central system 10 then creates a fund transfer record and submits to ACH 36 for crediting the funds from the central system bank 40 to the customer bank account 22.

Customer Interface 03

The central system 10 provides a customer interface allowing the interface to receive record 78 from customer 06 to create and enter account data, account identification code, and personal identification code. The interface additionally provides a record 80 to search and retrieve payment and refund transactions by type of transaction, transaction date, and merchant identification. It allows entry of customer identifying data and search query and receiving the data so requested. The interface is web-based and is prior art.

Merchant Interface 04

The central system 10 provides a merchant interface allowing the interface to receive record 82 from merchant to enter merchant identification, merchant account identification, and terminal identification. The interface additionally provides a record 84 to search and retrieve payment and refund transactions by type of transaction, by date, and transaction reference number. The interface allows entry of merchant identifying data, and a search query and receiving the data so requested. The interface is web-based and is prior art.

Second Embodiment Using Payment Card

Figure 7A:
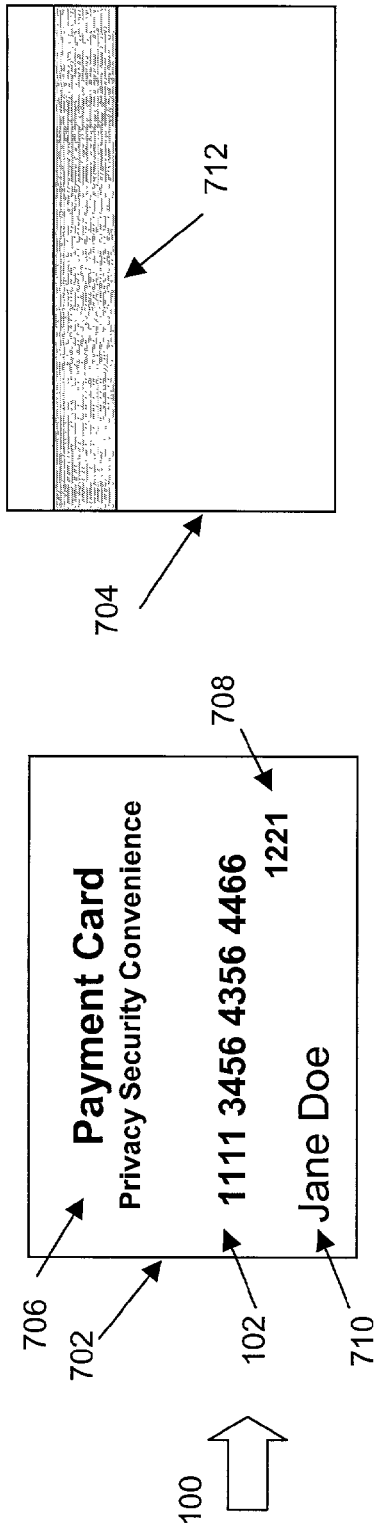
FIG. 7A illustrates a payment card having features of the present invention.
Figure 7B:
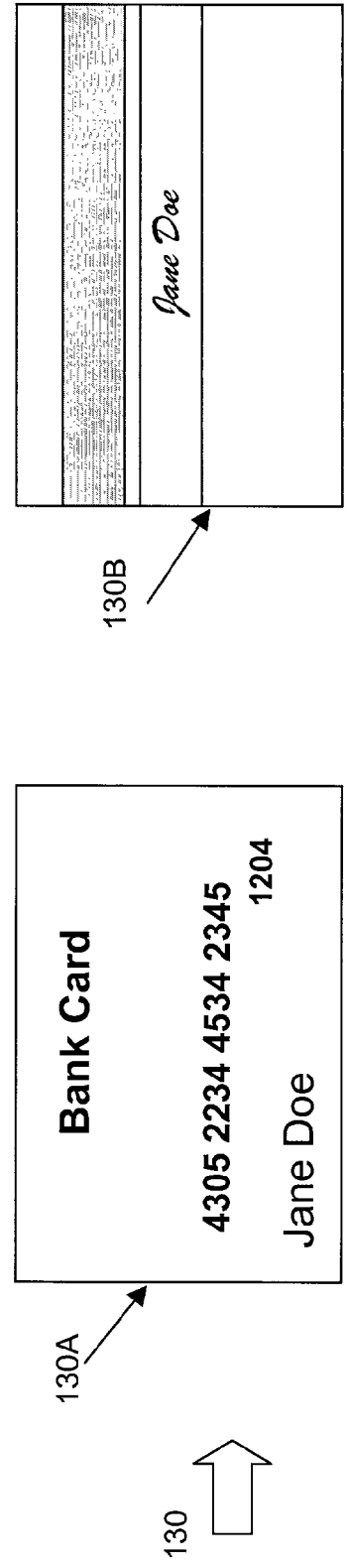
FIG. 7B illustrates a prior art bankcard that can be used with the payment system having features of the present invention.
Figure 7C:
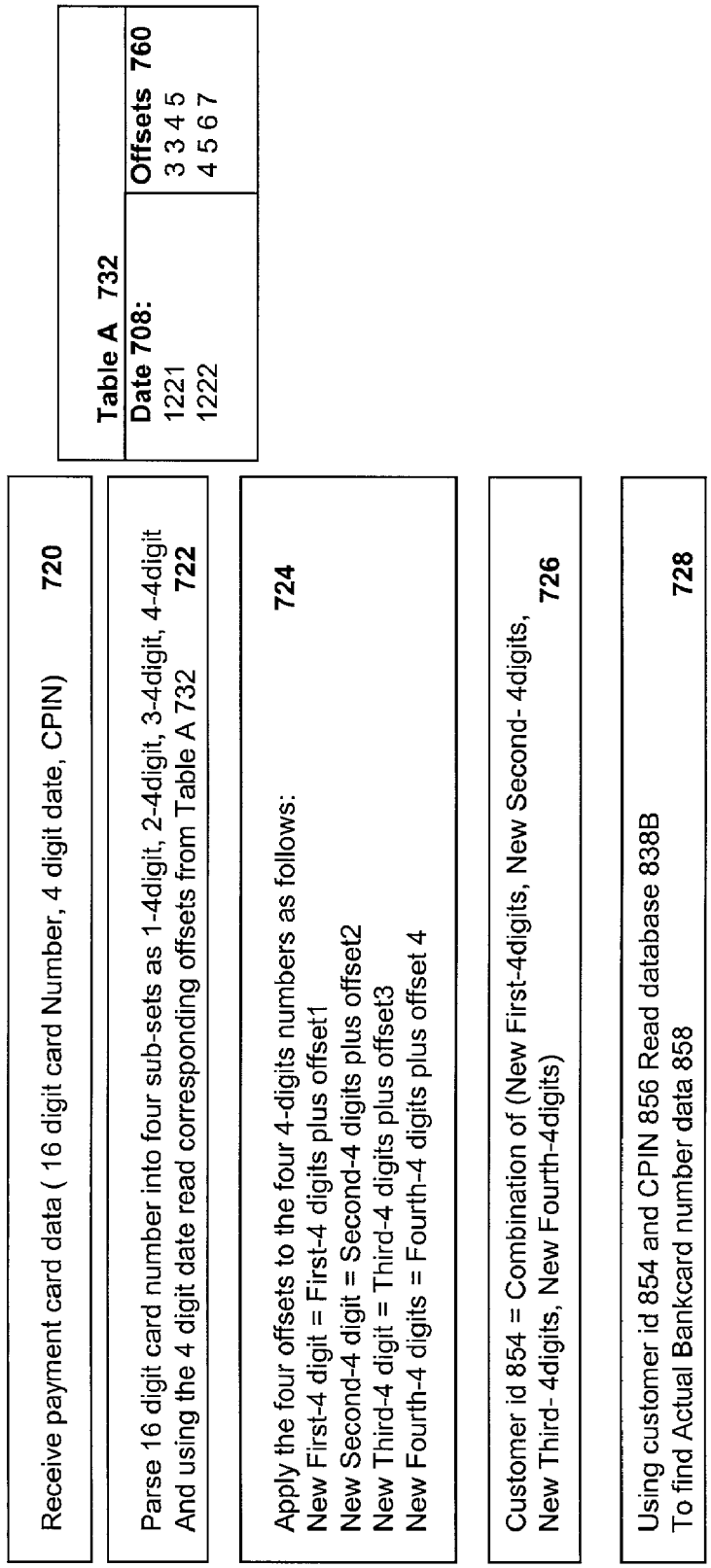
Figure 8:
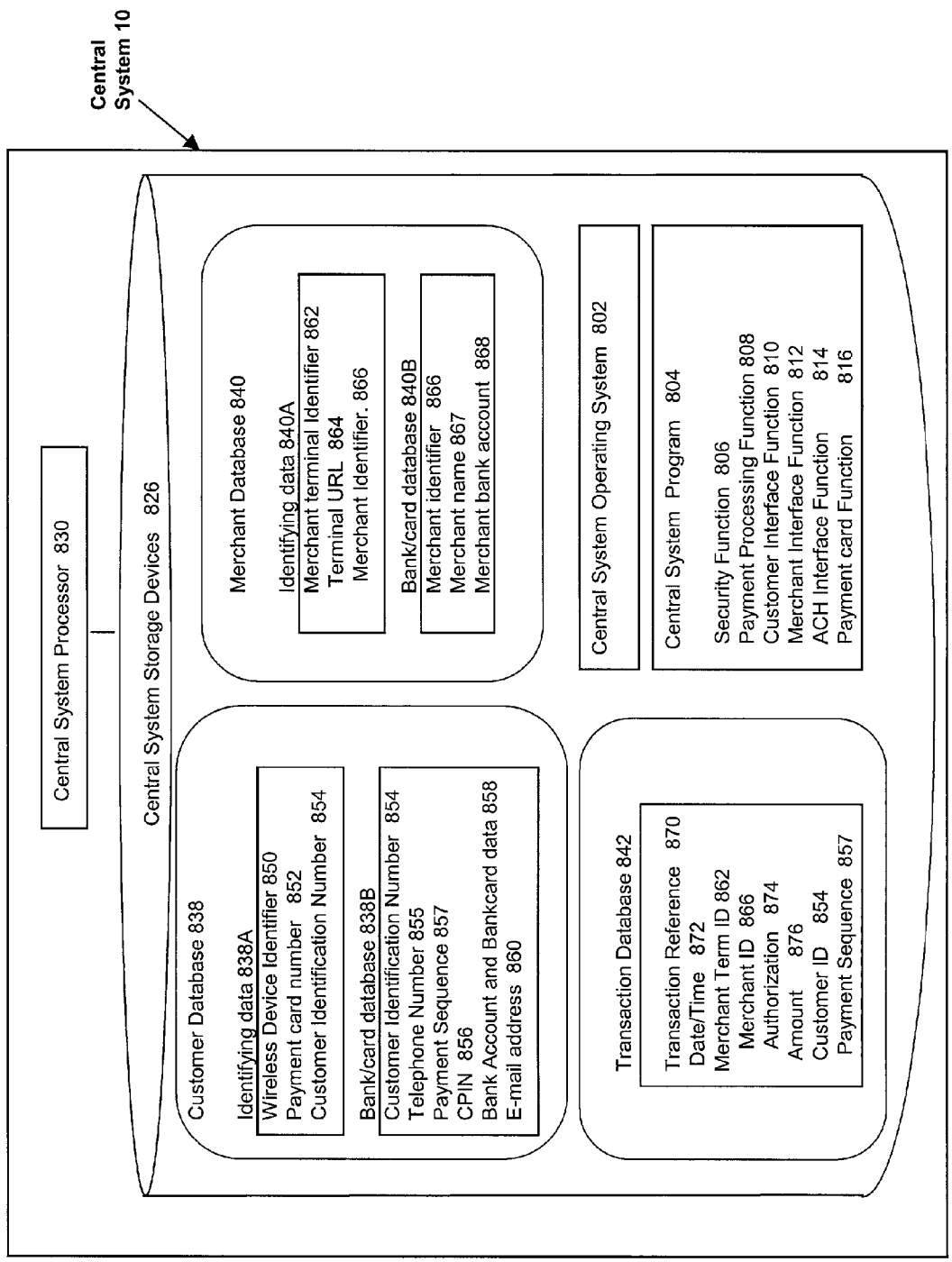
FIG. 8 illustrates a central system having features of the present invention.

With reference to FIGS. 3, 7 and 8, the payment system 02 between a customer 06 and a merchant 08 has a central system 10, a payment card 100 with an encrypted card number 102; a merchant card reader 104 and a merchant display terminal 14. The central system, the card reader, and the display terminal are on a global computer network 18, wherein the payment card 100 is used to effect a private and secure payment transaction.

Payment Card 100

A payment card of this invention is not a bankcard and has no relationship to a bank or a banking entity in its operation and use.

With reference to FIG. 7A, the payment card 100 has front side 702 and back side 704. The front side 702 has an encrypted card number 102. The encrypted card number resembles a bankcard number having 16 digits, the first four digits being in the form of bank identification identifying a bank, 4 digits resembling an expiration date 708, and a name of the card owner 710. In this invention, the identifying bank is the central system bank 40. The name 710 is any name chosen by the customer 06 and not necessarily the real name. A title 706 identifies the payment card. The backside 704 can include a machine-readable area 712 such as a magnetic strip. The magnetic strip can include data in an encoded form.

With this design, if the payment card 100 fell into the wrong hands, it does not identify the card owner or any of the existing bankcard(s) of the customer 06.

With reference to FIG. 3, when the customer 06 is using the payment card 100 at the location of the merchant 08, the payment card 100 can be swiped in a card reader 104. A Card Personal Identification Number (CPIN) is entered 106 into the card reader 104 by the customer. The merchant identification and a payment amount is entered into the card reader by the merchant 08, and a data record 108 including at least the foregoing data and the encrypted card number 102 is transferred over the global network 18 to the central system 10.

The central system 10 decrypts the payment card number 102 to identify the customer identification 854. FIG. 7C illustrates an approach of the Security Function 830 that takes encrypted card number 102 and determines the customer identification 854. At step 720, the card number 102 along with its expiration date 708 and a CPIN 856 that is entered by the customer 06 is received by the system 10. At step 722, the 16 digits of the card number 102 are parsed into four 4-digit numbers. In the security function 830, from table A 732, four offset numbers 760 that correspond to the 4-digit expiration date 708 are read. Table A 732 shows the offset numbers 760 that correspond to the expiration date 708. At step 724, the offset numbers 760 are added to each of the four 4-digit numbers. At step 726, the modified four 4-digit numbers are combined to form a customer identification number 854. At step 728, using the customer identification number 854 and the CPIN 856 from customer database 838B the particular bankcard data 858, which the customer wishes to use for this payment transaction is obtained.

Third Embodiment Using Bankcard

With this embodiment, an existing bankcard 130 of the customer 06 may be used by the customer in conjunction with a CPIN 856 for a payment transaction. However, this payment transaction is not identified in the customer's bank 22 records as originating from a merchant to whom the payment is being made. Thus the use of an existing bankcard 130 in conjunction with a CPIN 856 offers privacy and security to the customer during a payment transaction with an existing bankcard of the customer.

With reference to FIGS. 3, 7 and 9A, a payment system between a customer 06 and a merchant 08 has a central system 10, in conjunction with a portable wireless device 12, a payment card 100 with an encrypted card number 102, a standard bankcard 130, a merchant card reader 104 and a merchant display terminal 14 with an identification tag 16. The central system, the portable wireless device, the merchant card reader and the display terminal are on a global computer network. The customer selects either the portable wireless device, the payment card, or the bankcard to effect a payment transaction to the merchant.

Bank Card 130

FIG. 7B illustrates a bankcard 130 that can be used in conjunction with the present invention. The bankcard 130 can be a debit card, a credit card, a check card, or another type of card already obtained by the customer. The bank card 130 can include private data of the customer 06 including the name, number of the bank card, expiration date of the bankcard 130 and signature as illustrated on front and back sides 130A and 130B of the bank card 130.

The bankcard 130 is swiped in the card reader 104 and a card personal identification number (CPIN) 856 is entered into it by the customer. The merchant identification/terminal identification and a payment amount is entered into the card reader by the merchant 08; and a data record including at-least the foregoing data and the bankcard number is transferred over the global network to the central system 10.

The central system 10, with the bankcard number 130 and the CPIN 856 and by searching the database 838B, is able to verify the customer and also to identify pre-stored remainder bank card data 858 and assemble a payment transaction record. FIG. 9A steps 922 to 936 describe how the central system 10 separates a bankcard 130 from a payment card 100.

Fourth Embodiment Using Either a Wireless Device, a Payment Card or a Bankcard

Figure 4:
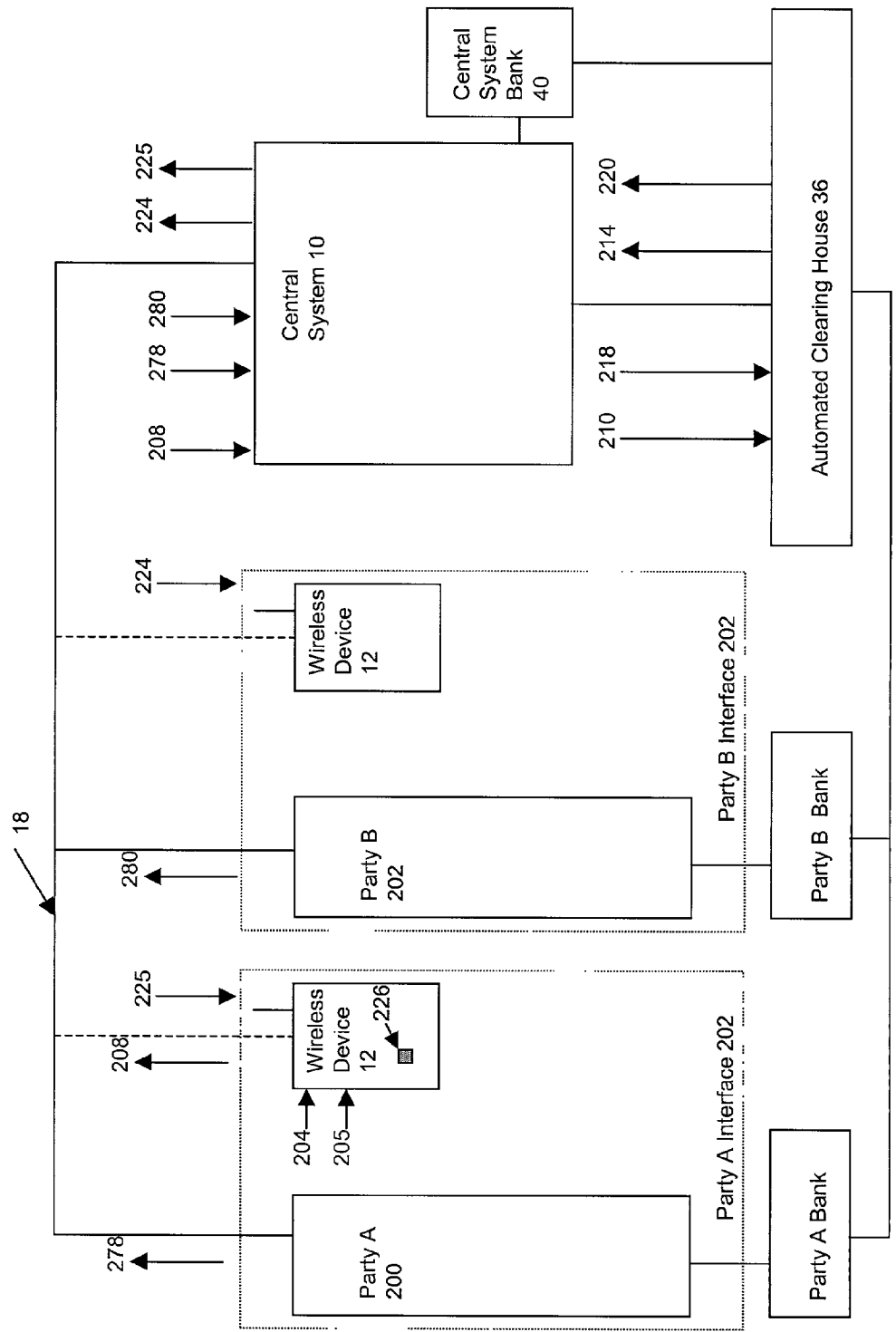
FIG. 4 is a block diagram that illustrates features of the present invention payment system between two private parties.

With reference to FIGS. 4 and 8, a payment system between two parties has a central system 10, a portable wireless device 12 belonging to party A 200, the central system 10 and the portable wireless device 12 are on a global computer network 18. The portable wireless device 12 is used to effect a private and secure payment transaction to private party B 202. At time of payment transaction from party A to party B, a party B identification 204 and a payment amount 205 are entered into device 12. The party B identification may be the party B's telephone number 855. Party identification in the form a telephone number is preferred as it is the most widely familiar structure of numbers. In actual use it may be a real telephone number of the party or a made up telephone number. Alternatively other forms of identification may be used.

On activating a payment function 226 in the wireless device 12, a data record 208 including at least the party B identification 855, the payment amount 205 and a portable wireless device identification code 850 is transferred over the global network 18 to the central system 10. The wireless device identification code is a combination of a pre-programmed identification code and a customer entered CPIN 856 to identify which card or bank account 858 the payment is being made from.

The device 12 has a payment function 226. The payment function 226 is a firmware function within the device 12, which may be activated by a menu item called "payment", a key pad key combination such as an arrow key followed by a numeric key, or a special key for payment. The payment function 226 on being activated creates an encrypted payment data record 208 including at least the party B's identification 855, the payment amount, CPIN 856 and the device identification 850 and transfers it over the global network to the central system 10.

The central system 10 has two database 838A and 838B that identify party A's identification and a party B's bank account identification. The system 10 assembles a payment transaction record 210 including at least the party A pre-stored bank account data 858, payment amount and identifies a central system business bank 40, submits the payment transaction record 210 to an automated clearing house 36 and receives a payment authorization record 214.

The central system 10 using the database 838B identify Party B's identification 855 and a party B's bank account identification 858. The system 10 assembles a payment transaction record 218 including at least party B 202 pre-stored bank account data, payment amount and identifies the central system bank 40 and submits the payment transaction record 218 to an automated clearing house 36 and receives a payment authorization record 220.

The central system 10, having party A and party B identifications and their e-mail addresses 860 in database 838B sends a e-mail notification 225 of the payment authorization to the party A and e-mail notification 224 to party B's e-mail address.

In this embodiment party A has made a private and secure payment to party B without either party A or party B knowing each other's personal and sensitive data. Conversely party B can make a similar payment to party A. Party A or B need to know each other's telephone number or a pseudo telephone number to make such a private payment Fifth Embodiment Using Wireless Device to Withdraw Cash from an ATM This embodiment of the payment system 10 enables the use of an ATM to withdraw cash without the need to carry an ATM card. Privacy and security is provided to a user because the ATM card which identifies the owner by name and card number, need not be carried on the person.

Figure 6:
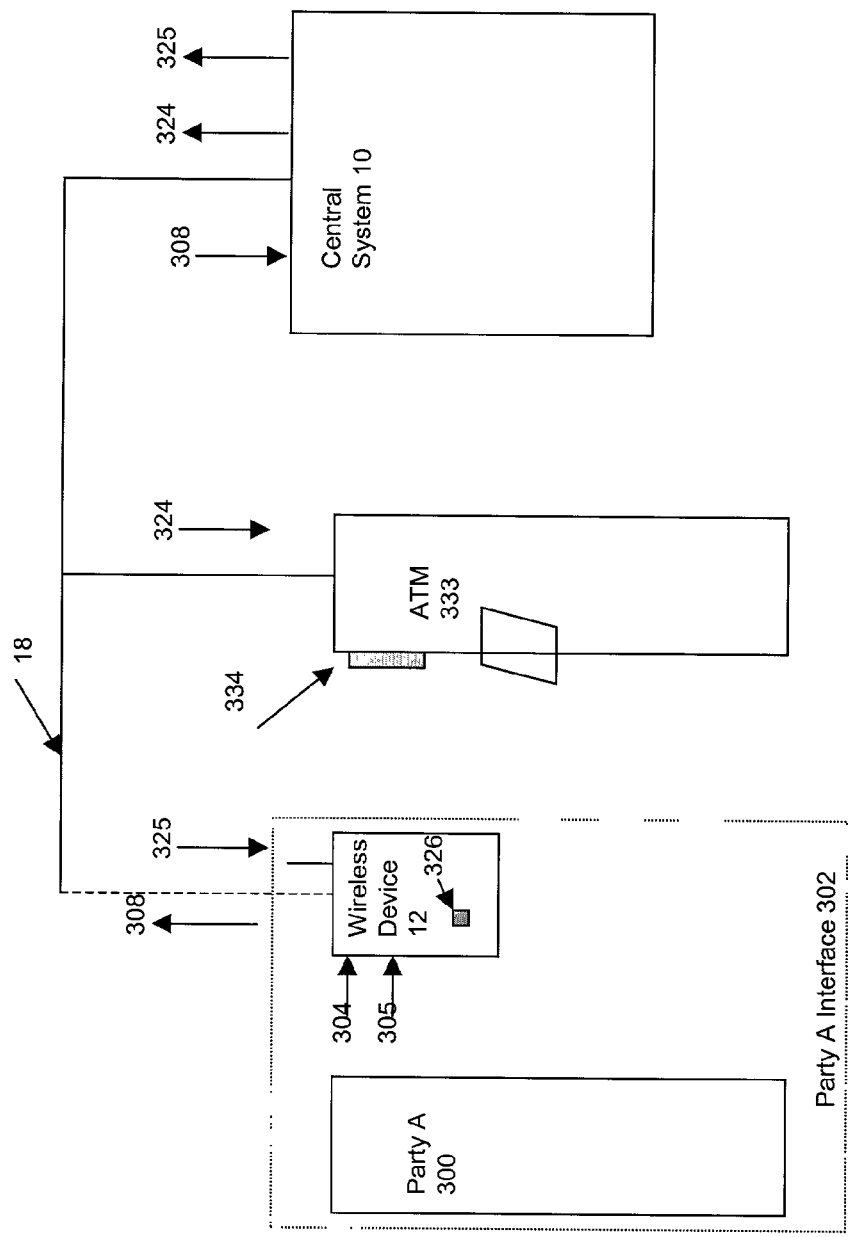
FIG. 6 is a block diagram that illustrates the use of a wireless device for withdrawing cash from an ATM having features of the present invention.

With reference to FIG. 6 and 8, a cash withdrawal system between a party A 300 and an ATM machine has a central system 10, a portable wireless device 12 belonging to customer 300, an ATM machine 333 and a ATM identification tag 334. The central system 10, the portable wireless device 12, and the ATM 333 are on a global computer network 18 and the portable wireless device 12 is used to effect a cash withdrawal transaction from the ATM 333.

The portable wireless device 12, with a built-in reading element 502, at the time of a withdrawal transaction, reads the terminal identification tag 334 and a withdrawal amount 305, and a CPIN 856 is entered into it 305. A withdraw function 326 in the wireless device is activated, enabling a data record 308 including at least the ATM terminal identification, the withdrawal amount, a portable wireless device identification code and the CPIN to be transferred over the global network to the central system 10.

The device 12 has a withdrawal function 326. The withdrawal function 326 is a firmware function within the device 12, which may be activated by a menu item "withdraw", a key pad key combination such as an arrow key followed by a numeric key, or a special key for payment. The withdraw function 326 on being activated creates an encrypted withdraw data record 308 including at least the ATM terminal identification 334, the withdraw amount 304, CPIN 854 and the device identification code 850 and transfers it over the global network to the central system 10.

The central system 10 assembles a withdraw transaction record 324 including the customer pre-stored bank account data 858, and submits the withdraw transaction record to the ATM system 333, enabling the ATM to process and disburse cash amount to the party 300. The ATM 333, knowing the means of arrival of ATM card data from the central system 10 as opposed to from an ATM card insertion, suppresses printing of a paper record for the ATM customer, because an e-mail notification 325 is sent to the party 300 by the central system 10.

Central System 10

Referring to FIG. 8, the central system 10 includes (i) a system storage device 826, (ii) a system operating system 802 stored in the payment system storage device 826, (iii) a system program 804 stored in the system storage device 826, (iv) and a system processor 830 connected to the payment system storage device 826.

The payment system processor 830 can include one or more conventional CPU's. The payment system processor 830 can be capable of high volume processing and database searches.

The payment system storage device 826 can, for example, include one or more magnetic disk drives, magnetic tape drives, optical storage units, CD-ROM drives and/or flash memory. The payment system storage device 826 also contains a plurality of databases used in the processing of transactions pursuant to the present invention. For example, as illustrated in FIG. 8, the system storage device 826 can include a merchant database 840, and a customer database 838 and a transaction database 842.

The system 10 includes a system network interface (not shown) that allows the system 10 to communicate with the customer 06. Conventional internal or external modems may serve as the system network interface. In one embodiment, the system network interface is connected to the customer interface 03 on a global network 18.

A merchant network interface (not shown) allows the merchant 08 to communicate with the system 10. Conventional internal or external modems may serve as the merchant network interface. In one embodiment, the merchant network interface 04 is connected to the system 10 on the global network 18.

The system 10 interfaces with an ACH/bank card authorization network 36. The ACH/bankcard authorization network 36 is a computer system that process data from an existing bankcard or an automated clearing house to process payments between banks.

The payment system processor 830 is operative with the system program 804 to perform the Security Function 806, Payment Processing Function 808, Customer Interface function 810, Merchant Interface function 812, ACH interface function 814, and payment card function 816.

Central System Program 806

The central system program 806 is operative with the central system processor 830 to provide the functions of (i) Security Function 806, (ii) Payment Processing Function 808, (iii) Customer Interface Function 810, (iv) Merchant Interface Function 812, (v) an ACH Interface function 814, (vi) and a payment card function 816. Further, the system program 804 is operated with the payment system processor 830 to perform the tasks of the central system 10 provided herein.

The Security Function 806 performs the tasks of determining and verifying the customer identification and the specific bank account when the customer initiates a transaction using either a wireless device 12, a payment card 100, or a bankcard 130. For a payment card 100, the logic is as illustrated earlier with reference to FIG. 7C.

The payment processing function 808 performs the tasks of creating payment records and notification records that are transmitted to and from the central system 10. FIGS. 3, 4, and 6 explain the records that are transmitted from and to the central system.

The customer Interface function 810, via a web interface, performs the tasks of permitting the customer to open an account, enter data and to search and retrieve his transaction data.

The merchant Interface function 812, via a web interface, performs the tasks of permitting the merchant to open an account, enter data and to search and retrieve his transaction data.

The ACH interface function 814 performs the tasks of sending and receiving transaction records from and to the prior art ACH/bankcard processing network 36.

The payment card function 816 performs the tasks of creating, printing and mailing the payment card 100 of this invention to the customer 06 on his request via the customer interface function 810. Another business experienced in printing bankcards may be utilized to actually print the payment card 100 and mail them to the customer 06.

Customer Database 838

With reference to FIG. 8, the customer database 838 within the central system 10 contains private data specifically related to the customer 06 that is transferred to the system 10 from the customer. The private data related to the customer 06 can be separated and stored in at least two separate sub-databases, namely, (i) an identifier sub-database 838A, and (ii) existing bank card data sub-database 838B. The sub-databases are explained below.

Identifying Sub-database 838A

This database contains the wireless device identifier 850, payment card number 852 and a customer identification number 854. This database is used by security function 806 on first contact with the central system 10, either by a wireless device 12 or payment card 100, to identify a customer identification 850.

Existing Bank Card Data Sub-database 838B

This database maintains private data of the customer anchored by the customer identification number 854. The customer identifier for private party B is a telephone number 855. The other data is CPIN 856, Bank account data 858 and e-mail address 860. Multiple CPIN and bank account data for each customer may be maintained allowing a customer to use any one of his/her accounts whether they be checking accounts, debit card accounts or credit card accounts. The payment sequence number 857 is used to identify one or more payment cards or bank accounts of the customer. The bank account data may contain customer name, bank number/routing number, card or account number and any specific PIN codes for that account.

The customer 06, party A 200, party B 202, party 300 may enter data into this database data via a web interface (not shown).

Merchant Database 840

This database maintains data on the merchants who use the payment system 02. There are two databases, one is a merchant identifying sub-database 840A and second is merchant bank account data sub-database 840B.

The sub-database 840A maintains data on each of the merchant display terminals 862, a terminal URL 864, and a merchant identification number 866. The terminal identification identifies a terminal of the merchant and is the one present on the terminal identification tag and is the one transferred to the wireless device 12. The terminal URL 864 is used to send a payment record to the terminal over the global computer network.

The sub-database 840B maintains data on the merchant 857 and merchant bank account 868 allowing funds from payment transactions to be directed to the merchant bank 48. The merchant data 857 may include merchant name and address.

The merchant 08 may enter data into this database data via a web interface (not shown).

Transaction Database 842

This database logs all payment transactions by a transaction reference 870, date/time of transaction 872, merchant terminal identification 862 from which the transaction originated, merchant ID 866, amount 876, authorization code 874 received from the ACH/card network and customer identification 854 and the sequence number of the payment account used for this transaction 857.

This database may be searched by the customer 06, via a search query record 80, to display payment transactions by a search criterion such as merchant identification and date/time ranges via a web interface (not shown).

This database may be searched by the merchant 08, via a search query record 82, to display payment transactions by a search criterion such as terminal identification and date/time ranges via a web interface (not shown).

Operation

The operation of the apparatus 02 and central system 10 for a payment transaction between a customer and a merchant can be further understood with reference to the flow chart illustrated in FIG. 9A. Importantly, the order of some or all of the steps can be varied. Further, not all of the steps outlined below are necessary to perform a transaction pursuant to the present invention.

At step 900, the customer 06 is at a merchant 08 ready to make a payment. At step 902, the customer 06 chooses from a wireless device 12 or a card payment choice. At step 904, the customer has selected the wireless device 12 for payment. At step 908, the customer 06 faces the reader element 504 of the wireless device 12 to the merchant system 20. The merchant terminal identification 862 and payment amount 852 are received wirelessly via infrared received into the wireless device 12. Alternatively, the customer may scan the identification tag 16 using reading element 502 and manually enter the payment amount into the device 12. If the customer 06 is not at the location of the merchant 08, the customer may manually enter both the terminal identification 862 and payment amount 852 into the device using its keypad 501A.

At step 910, the customer enters CPIN 854 for a specific existing bankcard and selects payment function 26. At step 912, the device 12 sends the payment record 28 to the central system. At step 914, the system receives record, decodes device ID 850 to find customer ID 854, verifies CPIN 856 and identifies the specific card 858 chosen by customer 06 for this payment transaction. At step 906, the customer has chosen card for payment.

At step 922, customer swipes card in the reader 104. At step 924, customer enters CPIN 856. At step 926, card reader 104 sends card number, CPIN, amount, and merchant identification to system 10. At step 928, system 10 determines type of card based on the first four digits as either a bankcard or a payment card. At step 930, a payment card is determined. At step 932, encrypted card number 102 is decoded to find customer ID 854 and verify CPIN 856 to identify the specific card 858 chosen for payment. At step 934, the system determines a bankcard has been chosen. At step 936, the system verifies card owner by the CPIN 856 and bankcard 858.

At step 916, the system 10 creates a transaction reference 870, assembles specific card data of name, card number, expiration date, and merchant identification as the central system business bank 40 and sends the payment transaction to the ACH 36. At step 918, system 10 receives authorization record, saves the record in the transaction database 842, and forwards the approval data to merchant display terminal. At step 920, the terminal receives approval data, letting the merchant 08 know that the transaction has been approved.

The operation of the apparatus 02 and central system 10 for a payment transaction between a party A and party B can be further understood with reference to the flow chart illustrated in FIG. 9B. Importantly, the order of some or all of the steps can be varied. Further, not all of the steps outlined below are necessary to perform a transaction pursuant to the present invention.

At step 940, Party A 200 wishes to make a private payment to party B 202 and inquires party B's telephone number. At step 942, Party A takes out its wireless device 12 and enters party B identification (telephone number), a payment amount, a CPIN and activates payment function 226. At step 944, the device 12 creates a payment record 208 and sends to central system 10. At step 946, central system 10 receives the data, decodes device Identification to find the customer identification number and verifies CPIN and identifies the specific account chosen by party A 200 for payment. At step 948, the central system 10 creates transaction reference, assembles specific account data of party A, central system bank identifier 40, amount and sends to the ACH and receives transfer of funds to the bank 40. At step 950, the central system 10 creates another transaction reference, assembles specific account data of party B, central system bank identifier 40, and amount and sends to the ACH to effect transfer of funds to party B's bank account. At step 952, the system 10 saves in transaction database 842 the data associated with the completion of transfer of funds and sends notification e-mail 225 to party A 200 and to party B 224.

In summary, the payment system 02 allows the customer 06 to maintain one payment card 100 in lieu of many bankcards to facilitate private and secure payments to a merchant 08. Alternatively, the payment system 02 allows the customer 06 to maintain a wireless device 12 in lieu of many bankcards to facilitate private and secure payments to a merchant 08. Alternatively, the payment system 02 allows the customer 06 to use his/her existing bankcards 130 to facilitate private and secure payments to a merchant 08. Also the payment system 02 facilitates private and secure payments between two private parties. Additionally the payment system 02 allows a private party to make a cash withdrawal at an ATM without the use of an ATM card. The payment system 02 provides private and secure payment transactions.

While the particular apparatus 02 as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

What is claimed is:

1. A payment system between a customer and a merchant that facilitates privacy and security of customer private data including bankcard data from merchant systems during a payment transaction to the merchant, comprising:
   a. a merchant sales terminal wirelessly transmits a terminal identification and a payment amount for a specific sales transaction;
   b. a wireless device of the customer receives from the sales terminal, the terminal identification and the payment amount specific to the sales transaction;
   c. the wireless device connects to a third party central system and transfers to the central system, a data record having a unique wireless device identifier, the terminal identifier and the payment amount;
   d. the central system using pre-stored customer bankcard data and merchant identification data, assembles and submits a payment authorization request to an automated clearing house (ACH) network, thus bypassing the merchant sales terminal and the merchant system from receiving customer private data.

2. The system as in claim 1, further comprising:
the central system forwards a payment authorization notification to the merchant sales terminal, thus bypassing the merchant system from receiving the customer private data for the payment transaction.

3. The system as in claim 1, further comprising:
the central system forwards a payment authorization notification to the customer wireless device, without need to get a printed paper notification from the merchant sale terminal.

4. The system as in claim 1, further comprising:
the wireless device has a payment function, that on being activated receives a wireless transmission of the terminal identification and the payment amount from the merchant sales terminal and sends the data record including at-least the terminal identification, the payment amount and the unique wireless device identification over a global network to the central system.

5. The system as in claim 4, further comprising:
the unique wireless device identification is a combination of a pre-programmed device identification code and a customer entered card personal identification number (CPIN).

6. The system as in claim 5, further comprising:
the customer by entering the CPIN into the wireless device, identifies a specific account data to be used for a payment transaction, wherein the customer having a plurality of pre-stored account data in the central system, each identified by a CPIN.

7. The system as in claim 1, further comprising:
the central system maintains a transaction database cataloging each payment transaction by a transaction reference, date, time, an authorization reference, payment amount, customer identification and merchant identification.

8. The system as in claim 7, further comprising:
a. a merchant refund terminal on the global computer network, wherein the merchant enters into the refund terminal a refund record, including at-least the payment transaction reference from a previous payment transaction, the merchant identification, a refund authorizing password, a refund amount, and sends the refund record to the central system;

b. the central system receives and verifies the elements of the refund record data with the transaction database, in particular verifies the refund amount is less than or equal to the payment amount, and creates a refund record including the merchant account identification, refund amount and submits to the ACH and receives an approval, and forwards that to the refund terminal and the customer wireless device.

9. The system as in claim 7, further comprising:
a customer interface with the central system enabling the customer to enter account data, account identification code, personal identification code and enabling the customer to create a search query to retrieve payment and refund transactions by type of transaction, transaction date, and merchant identification.

10. The system as in claim 7, further comprising:
a merchant interface with the central system enabling the merchant to enter merchant identification, merchant account identification, terminal identification and enabling the merchant create a search query to retrieve payment and refund transactions by type of transaction, by date, terminal identification, and transaction reference number.

11. The system as in claim 1, further comprising:
the payment transaction record submitted to the ACH identifies a central system business entity bank for receiving payment amount from the ACH.

12. The system as in claim 11, further comprising:
the central system submitting a merchant payment record to the ACH for transferring an aggregate amount from a plurality of the payment transactions into a merchant bank account, wherein the central system having a database relating the merchant terminal identification and a merchant bank account identification.

13. A method that facilitates a private and secure payment transaction between a customer and a merchant without disclosing customer private data including bankcard data to the merchant during payment transactions, comprising the steps of:
a. transmitting by a merchant sales terminal that wirelessly transmits, a sales terminal identification and a payment amount incident to a sales transaction;
b. receiving by a customer wireless device, with an interface to wirelessly receive, the merchant sales terminal identification and the payment amount specific to the sales transaction from the sales terminal;
c. connecting by the customer wireless device to a central system and transferring to the central system, a unique wireless device identifier, the sales terminal identification and the payment amount;
d. assembling and processing a payment transaction, by the central system, with an automated clearing house network, using customer bankcard data and merchant identification data that is pre-stored in the central system, thereby bypassing the merchant sales terminal and the merchant system from receiving customer private data.

14. The method as in claim 13, further comprising the steps of:
forwarding by the central system a payment authorization notification to the merchant sales terminal.

15. The method as in claim 13, further comprising the steps of:
forwarding, by the central system, a payment authorization notification to the customer wireless device.

16. The method as in claim 13, further comprising the steps of:
activating a payment function in the wireless device, receiving a wireless transmission of the terminal identification and a payment amount from the merchant sales terminal and sending a data record including at-least the terminal identification, the payment amount and a portable wireless device unique identification over a global network to the central system.

17. The method as in claim 13, further comprising the steps of:
a. maintaining a transaction database by the central system, cataloging each payment transaction by a transaction reference, date, time, an authorization reference, payment amount, customer identification and merchant identification;
b. enabling a customer interface with the central system enabling it to enter account data, account identification code, personal identification code and enabling it to create a search query to retrieve payment and refund transactions by type of transaction, transaction date, and merchant identification;
c. enabling a merchant interface with the central system enabling it to enter merchant identification, merchant account identification, terminal identification and enabling it to create a search query to retrieve payment and refund transactions by type of transaction, by date, terminal identification, and transaction reference number.

18. A payment system between a customer and a merchant that facilitates privacy and security of customer private data including bankcard data from merchant systems during a payment transaction to the merchant, comprising:
a. a merchant sales terminal that transmits a terminal identification and a payment amount for a specific sales transaction and a customer wireless device that receives from the sales terminal, the terminal identification and the payment amount specific to the sales transaction, and a wireless device connection that securely transfers to a central system, a unique wireless device identifier, the terminal identifier and the payment amount;
b. the central system assembles and processes a payment transaction with an automated clearing house network using pre-stored customer bankcard data and merchant identification data, thus bypassing merchant sales terminals and merchant systems from receiving customer private data during the payment transaction.

19. The system as in claim 18, further comprising:
the central system forwards a payment authorization notification to the merchant sales terminal and to the customer wireless device.

20. The system as in claim 18, further comprising:
the central system maintains a transaction database cataloging each payment transaction by a transaction reference, date, time, an authorization reference, payment amount, customer identification and merchant identification.

* * * * *